United States Patent [19]

Titcomb et al.

[11] Patent Number: 4,590,076
[45] Date of Patent: * May 20, 1986

[54] REDUCED CALORIE, HIGH FIBER CONTENT BREADS AND METHODS OF MAKING SAME

[75] Inventors: Stanley T. Titcomb, Portchester; Arthur A. Juers, Baldwin, both of N.Y.

[73] Assignee: Ralston Purina Company, St. Louis, Mo.

[ * ] Notice: The portion of the term of this patent subsequent to Sep. 7, 1993 has been disclaimed.

[21] Appl. No.: 154,242

[22] Filed: May 29, 1980

Related U.S. Application Data

[63] Continuation-in-part of Ser. No. 689,449, May 24, 1976, abandoned, which is a continuation-in-part of Ser. No. 494,011, Jul. 30, 1974, Pat. No. 3,979,523.

[51] Int. Cl.$^4$ .................. A21D 10/00; A21D 13/00
[52] U.S. Cl. .................................... 426/62; 426/19; 426/21; 426/549; 426/804
[58] Field of Search .............. 426/19, 21, 804, 62, 426/549

[56] References Cited

U.S. PATENT DOCUMENTS

| | | | |
|---|---|---|---|
| 243,521 | 6/1881 | Davidson | 426/330.3 |
| 352,809 | 11/1886 | Davidson | 426/330.3 |
| 2,860,987 | 11/1958 | Werner | 426/330.3 |
| 3,023,104 | 2/1962 | Battista | 426/804 |
| 3,047,396 | 7/1962 | Steinberg | 426/597 X |
| 3,117,004 | 1/1964 | McFarlane | 426/422 X |
| 3,573,061 | 3/1971 | Glabe et al. | 426/19 X |
| 3,574,634 | 4/1971 | Singer | 426/19 X |
| 3,676,150 | 7/1972 | Glicksman et al. | 426/19 X |
| 3,767,423 | 10/1973 | Tsantir et al. | 426/804 |
| 3,979,523 | 9/1976 | Titcomb et al. | 426/19 |
| 4,008,339 | 2/1977 | Matsuda | 426/422 X |
| 4,027,046 | 5/1977 | Bohm et al. | 426/330.3 |
| 4,282,261 | 8/1981 | Greene | 426/330.4 |
| 4,288,462 | 9/1981 | Horl et al. | 426/330.3 X |

FOREIGN PATENT DOCUMENTS

| | | | |
|---|---|---|---|
| 1959196 | 6/1971 | Fed. Rep. of Germany | |
| 0040236 | 10/1980 | Japan | 426/422 |
| 14373 | of 1893 | United Kingdom | 426/422 |
| 2056485 | 3/1981 | United Kingdom | 426/422 |

OTHER PUBLICATIONS

Pintauro, Soluble Tea Production Processes, 1970, Noyes Data Corp.: Park Ridge, N.J., pp. 11, 18, 19, 92-95, 100, 101, 118-134.

Primary Examiner—Joseph Golian
Attorney, Agent, or Firm—Virgil B. Hill

[57] ABSTRACT

The reduced calorie bread compositions of this invention incorporate an alpha-cellulose substituent and have a higher fiber content than comparable standard bread products. The compositions include standard ingredients as well as various effective amounts of non-standard ingredients which enhance the taste and improve the texture so that the reduced calorie, high fiber bread compositions have comparable eating quality and textures as standard bread products.

2 Claims, No Drawings

REDUCED CALORIE, HIGH FIBER CONTENT BREADS AND METHODS OF MAKING SAME

CROSS-REFERENCE TO RELATED APPLICATIONS

This application is a continuation-in-part of application Ser. No. 689,449, filed May 24, 1976 (now abandoned) which was a continuation-in-part of application Ser. No. 494,011, filed July 30, 1974, now U.S. Pat. No. 3,979,523 and assigned to the same assignee of this invention.

BACKGROUND OF THE INVENTION

This invention relates to reduced calorie bread having higher fiber content than is conventional and more particularly, to reduced calorie white, wheat and similar types of bread, all of which have less calories and higher fiber content than is ordinarily the case in conventional breads.

It has long been desired, and many attempts have been made in the food industry, to produce a low calorie enriched bread which may be used in place of the standard enriched bread, since it has become a standard in the industry and widely accepted by young and old alike. Sliced white bread has become so common to the consuming public that its volume of consumption has never been approached by any of the other breads combined, i.e., ryes, proteins, rolls, and the like. Contributing to its appeal is the taste, softness, toastability, texture, and eating quality of white bread. Further, its use for making large number of sandwiches daily has brought its use to the point that there has been no close competitor in satisfying the consuming public.

However, with this standard white enriched bread, there is a definite problem of the amount of caloric intake per bread slice and in some cases, in elderly persons, the white enriched bread has affected their digestive and elimination systems due to the consistency and texture of white bread. It has become extremely difficult for people to diet, as well as for old people to change their eating habits, because of the desire and habits of using white enriched bread. One of the past problems in substituting a low calorie bread for the standard white enriched bread has been the reluctance of the consuming public, children to adults, to reach for the low calorie bread. Some of these factors include: "It did not look the same"; "It did not feel the same."; and "It did not have the same texture and taste as enriched white bread." Therefore, reduced calorie bread has never been accepted by the general public, to their health detriment.

Previous attempts to utilize various materials in low calorie, yeast leavened baked products are illustrated by: The Glicksman et al U.S. Pat. No. 3,676,150 which includes a reference to a copending and apparently abandoned application, U.S. Ser. No. 753,708 assigned to General Foods Corporation, it being clearly stated in the Glicksman et al patent that the subject matter of the Swanson application fails to disclose how a satisfactory bread or any other yeast leavened product can be made with the use of alpha-cellulose. Another attempt is described in the Tsantir U.S. Pat. No. 3,767,423 assigned to The Pillsbury Company, wherein a low calorie bread is prepared by employing, as a replacement of a portion of the conventional dough ingredients, a mixture of finely divided edible hulls of vegetable origin comprising a mixture of rice hulls and soybean hulls. In the Background portion of the Tsantir patent reference is made to U.S. Pat. No. 3,348,951. Other examples of prior art found in German Pat. No. 1,959,196; U.S. Pat. No. 3,574,634 in the name of Richard L. Singer and U.S. Pat. No. 3,023,104 in the name of Battista, assigned to American Viscose Corporation.

None of these products referred to in the above-mentioned patents has proved to be a satisfactory solution to the problem as outlined above. The compositions of this invention, and the methods utilized to produce bread products from them, overcome the problems by providing a reduced calorie enriched bread having a high fiber content while maintaining standard bread eating quality and texture without reducing mineral or protein value in the compositions of this invention.

SUMMARY OF THE INVENTION

It is therefore an object of this invention to produce a reduced calorie product having higher than normal fiber content which overcomes the prior art problems.

It is also an object of this invention to produce reduced calorie white and wheat enriched bread products having a substantial reduction in caloric content as compared to standard white and wheat enriched bread.

According to the broader aspects of this invention, the bread composition incorporates a selected alphacellulose additive in effective amounts which, together with effective amounts of taste enhancements and other ingredients, produce resultant white and wheat enriched bread products having a substantially less caloric content than comparable standard white and wheat enriched bread and specifically, in preferred examples for white and wheat bread products having substantially less, and preferably at least 25 to 30% less, caloric content than comparable white and wheat enriched breads.

A specific feature of this invention is the elimination of some of the caloric contributing ingredients and the addition of ingredients not normally found in enriched breads while still producing products having the same size, eating quality and texture of known conventional enriched breads.

In order to solve the problems inherent in the prior art, it was necesary, prior to producing an interchangeable and equally acceptable enriched low calorie bread, to define and set the goals for the degree of caloric reduction possible. It was determined that a much greater than 25–30% caloric reduction, while making a satisfactory product, might result in a lower calorie bread with little consumer acceptance. Furthermore, it was determined that the prior art attempts for producing a bread with 10 to 15% fewer calories did not have sufficient caloric reduction to have a substantial impact on the consuming public sufficient to warrant large scale production of such minimally reduced calorie loaves of bread. The preferred goal established and the one accepted by the FDA is a low calorie enriched bread having at least a 25 to 30% reduction in caloric content. At the same time, the product includes a high percentage of fiber compared to standard breads.

In order to fully appreciate the invention, the following typical standard formulation for white enriched bread, for typical wheat bread and typical whole wheat bread in accordance with the prior art is tabulated below. The concentration of the ingredients are indicated in parts by weight based on 100 pounds of flour and identified in accordance with standards in practice in the industry.

STANDARD WHITE ENRICHED BREAD

| INGREDIENTS | Parts By Weight Based On 100 Lbs. Flour |
|---|---|
| SPONGE | |
| Wheat Flour, Patent | 65.00 |
| Yeast | 2.50 |
| Yeast Food | 0.50 |
| Hydrated Mono- and Diglycerides | 0.75 |
| Lard | 3.00 |
| Water | 37.00 |
| Vitamin and Mineral Enrichment | (Two tablets) |
| DOUGH | |
| Flour | 35.00 |
| Salt | 2.25 |
| Corn Sugar (dry) | 10.00 |
| Soy Flour and Whey | 2.00 |
| Calcium Sulfate | 0.40 |
| Calcium Propionate | 0.10 |
| Water | 24.00 |

PROCEDURE

The procedure for the standard bread is to mix the sponge ingredients in a standard mixer for approximately four minutes and allow the sponge to ferment for approximately four hours at about 76° F. The sponge is then combined with the dough ingredients and mixed for approximately ten minutes. The mixed dough is then allowed to relax for an additional 30 minutes before weighing and 10 minutes before shaping into individual loaves which are placed in bread pans and allowed to proof for approximately one hour. The proofed loaves are baked for approximately 21 minutes at 415° F., cooled and sliced.

The foregoing ingredient composition and procedure is established for large commercial bakeries. The sponge and dough ingredients are handled in a manner which facilitates large volume production of bread for shipping and delivering to retail outlets with a minumum of holding time from production of the sponge to purchase by the consumer.

TYPICAL WHEAT BREAD

| INGREDIENTS | Control A Parts By Weight Based On 100 Parts Flour |
|---|---|
| SPONGE | |
| Wheat Flour, Patent, Enriched | 65.0 |
| Yeast | 2.8 |
| Yeast Food | 0.5 |
| Wheat Gluten | 2.0 |
| Shortening | 3.0 |
| Hydrated Mono- and Diglycerides | 0.75 |
| Water | 33.0 |
| DOUGH | |
| Wheat Flour, Patent, Enriched | 10.0 |
| Whole Wheat Flour, Fine | 25.0 |
| Salt | 2.25 |
| Sucrose | 3.25 |
| Refiners Syrup | 7.00 |
| Calcium Propionate | 0.15 |
| Water | 32.00 |

PROCEDURE

Essentially same as the Standard White Enriched Bread as set forth above.

TYPICAL 100% WHOLE WHEAT BREAD

| INGREDIENTS | Control B Parts By Weight |
|---|---|
| SPONGE | |
| Whole Wheat Flour | 65.0 |
| Yeast | 2.7 |
| Yeast Food | 0.6 |
| Shortening | 3.0 |
| Hydrated Mono- and Diglycerides | 0.6 |
| Water | 39.0 |
| DOUGH | |
| Whole Wheat Flour | 35.0 |
| Salt | 2.3 |
| Sucrose | 3.5 |
| Refiners Syrup | 5.0 |
| Honey | 3.0 |
| Calcium Propionate | 0.15 |
| Water | 25.0 |

Procedure

Essentially same as the Standard White Enriched Bread as set forth above.

With the foregoing in mind and utilizing the same standards present in the art in the industry, it was necessary to discover ingredient mixes and proportions thereof, as well as procedures in keeping with standard commercial procedures producing bread having substantially reduced calories and preferably 25 to 30% less calories as compared to conventional breads of the type illustrated in the controls described above.

Summarizing, various formulations were tried along with the results indicated, and are set forth in the examples below. From this it will be seen that the variations in the standard formulae call for a reduction in patent wheat flour utilizing alpha-cellulose to replace a substantial portion of the starch contributed by the flour; the elimination of lard; and that the standard corn sugar or normal sweeteners utilized should be reduced substantially or substitute products utilized; a protein, for example a wheat protein, gluten, is added in substantially effective amounts to compensate for the loss in protein value due to reduction of flour; the selected alpha-cellulose products were incorporated in varying amounts; total water content materially increased; and brown sugar was utilized to replace a substantial amount of the corn sugar; and varying quantities of flavoring added in order to maintain flavor quality. Preferred combinations are set forth in the following examples. Ingredients are listed as indicated in parts by weight based on 100 pounds of total flour in accordance with industry procedures.

EXAMPLE I

Special Formula Light Bread

Three doughs were mixed and tested using the following special formula light bread to reduce calories.

| | % |
|---|---|
| SPONGE | |
| Flour, Patent (14% Moisture Basis) | 50.00 |
| Cracked Wheat | 10.00 |
| Yeast Food | 0.50 |

-continued

|  | % |
|---|---|
| Yeast | 2.5 |
| Monocalcium Phosphate | 0.125 |
| Water (on total flour) | 35.375 |
| DOUGH |  |
| Flour | 40.00 |
| Salt | 2.65 |
| Corn Sugar | 12.00 |
| Nonfat Dry Milk | 4.5 |
| Lactalbumin | 2.0 |
| Hydrated Mono and Diglycerides | 0.75 |
| Wheat Gluten | 7.00 |
| Wheat Germ Flakes | 2.00 |
| Calcium Propionate | 0.125 |
| Yeast | (see variables below) |
| Cellulose | (see variables below) |
| Water | (see variables below) |

Variable Number (1) 15% powdered alpha-cellulose (particle size: 61.5% pass thru 200 mesh screen)
1% yeast, 120% total water absorption.
(2) 15% microcrystalline cellulose
1% yeast, 108% total water absorption.
(3) 20% powdered alpha-cellulose (particle size: 61.5% pass thru 200 mesh screen)
1.5% yeast, 131% total water absorption.

The term "powdered alpha-cellulose" used herein refers to a purified food grade alpha-cellulose, mechanically disintegrated cellulose prepared by processing alpha-cellulose obtained as pulp from fibrous plant materials. It exists in several grades of fineness. The term "microcrystalline cellulose" is material which is purified, partially depolymerized cellulose prepared by treating alpha-cellulose with mineral acids. Microcrystalline cellulose is described in "Food Chemicals Codex, 2nd Edition (1972)" at pages 185–186. These cellulose materials meet the U.S. Government specifications set forth in the National Formulary, XIV Edition (July 1, 1975) at pages 21 and 22.

Procedure

Essentially the same as the Standard White Enriched Bread as set forth hereinbefore.

The results of the test show that the best bread was the third formula, that including the 20% powdered alpha-cellulose, 1.5% yeast having 131% absorption. The doughs from (1) and (2) were too slack and collapsed. It appeared, as a result of this test, that microcrystalline cellulose does not absorb the water that powdered alpha-cellulose does. The third variable formula above utilizing 20% powdered alpha-cellulose produced the following table illustrating a reduction of calories compared to a standard formula of approximately 25% less calories calculated by the "Atwater method" using the values taken from USDA Agriculture Handbook No. 8 (Revised December, 1963).

Calorie Reduction

Calculated calories based on formula with 20% powdered alpha-cellulose (Variable No. (3)).

|  | Weight | Calories | Solids |
|---|---|---|---|
| Flour | 90.0 | 329.0 | } 86.0 |
| Cracked Wheat | 10.0 | 33.0 |  |
| Yeast Food | 0.5 | 0.7 | 0.5 |

-continued

|  | Weight | Calories | Solids |
|---|---|---|---|
| Yeast | 4.0 | 3.52 | 1.2 |
| Calcium Acid Phosphate | 0.125 | — | 0.125 |
| Wheat Germ Flakes | 2.0 | 7.8 | 2.0 |
| Salt | 2.65 | — | 2.65 |
| Corn Sugar | 12.0 | 43.92 | 9.0 less fermentation |
| Nonfat Dry Milk | 4.5 | 16.3 | 4.3 |
| Lactalbumin | 2.0 | 7.3 | 2.0 |
| Calcium Propionate | 0.125 | — | 0.125 |
| Hydrated Mono- and Diglycerides | 0.75 | 2.3 | 0.26 |
| Wheat Gluten | 7.0 | 26.48 | 6.3 |
| Powdered Alpha-cellulose | 20.0 | — | 20.0 |
| Water | 131.0 | — | — |
|  | 286.65 | 470.32 | 134.465 |
|  | × .87 | yield |  |
|  | 249.3855 |  |  |
| Variation No. (3) |  |  | 46% moisture 54% solids |

Regular Formula — $\frac{1.89 \text{ cal/g}}{2.64 \text{ cal/g}}$ = 71.59% or 28.41% reduction in calories.

Summary

Example I illustrates what has been described above and demonstrates that microcrystalline cellulose products described in the prior art did not produce satisfactory doughs or breads. Whereas the Variation No. (3) in the formula set forth above, i.e., 20% powdered alpha-cellulose with the change in the amount of yeast and higher water absorption produced a product which exceeded the preferred goal of a 25% calorie reduction using the Atwater method of calculation. However, it was also noted that the breads made with the powdered alpha-cellulose having less than 70% particles which pass through the 200 mesh screen did not produce commercial quality breads.

EXAMPLE II

Diet Bread

Ten doughs were made utilizing the following formulations:

| SPONGE | % |
|---|---|
| Flour, Patent | 70.00 |
| Yeast | 2.50 |
| Yeast Food | 0.67 |
| Wheat Gluten | 2.00 |
| Water | 41.00 |
| Vitamin and Mineral Enrichment | (0.43 grams) |

The sponge was mixed for four minutes and set at 78° F. for 3½ hours.

| DOUGH | % |
|---|---|
| Flour, Patent | 30.00 |
| Salt | 3.00 |
| Brown Sugar | 6.00 |
| 80% Soy Flour and 20% Whey | 3.00 |
| Wheat Gluten | 8.00 |
| Calcium Propionate | 0.50 |
| Yeast | 2.00 |
| Alpha-cellulose (see variables below) | 15.00 |
| Water | 88.00 |
| Sodium Stearoyl Lactylate | 0.50 |

-continued

| DOUGH | % |
|---|---|
| Potassium Bromate | (60 ppm.) |

Variable Number

Different samples of alpha-cellulose were used as follows:

Dough No. 1
 Powdered Alpha-cellulose HW-200, the International Filler Corporation, No. Tonawanda, N.Y. having the following characteristics:
 Grade/Identifier HW-200
 Raw Material Bleached Sulphate Woodpulp (Hardwood)
 Chemical Properties:
  Alpha Content—92.3%
  10% KOH Sol.—20.0
  Ether Extract—0.09
  G.E. Brightness—89.0%
 Physical Properties:
  Moisture—7%
  Bulk Density—300 ML/50 Gram

| Typical Screen Analysis - | | |
|---|---|---|
|  | % on | % thru |
| 100 Mesh | 4.0 |  |
| 200 Mesh | 26.0 | 61.5 |

Dough No. 2
 Powdered Alpha-cellulose BH-200, the International Filler Corporation, No. Tonawanda, N.Y. having the following characteristics:
 Grade/Identifier BH-200
 Raw Material Bleached Sulphite Woodpulp (Hardwood)
 Chemical Properties:
  Alpha Content—89.0%
  10% KOH Sol.—17.0
  Ether Extract—0.24%
  G.E. Brightness—94.0%
 Physical Properties:
  Moisture—5-7%
  Bulk Density—135 ML/50 Gram

| Typical Screen Analysis - | | |
|---|---|---|
|  | % on | % thru |
| 100 Mesh | 2.5 |  |
| 200 Mesh | 10.0 | 86.0 |

Dough No. 3
 Powdered alpha-cellulose C-200, the International Filler Corporation, No. Tonawanda, N.Y. having the following characteristics:
 Grade/Identifier C-200
 Raw Material Bleached Sulphite Woodpulp (Softwood)
 Chemical Properties:
  Alpha Content—92.3%
  10% KOH Sol.—8.3
  Ether Extract—0.10%
  G.E. Brightness—94.5%
 Physical Properties:
  Moisture—5-7%
  Bulk Density—210 ML/50 Gram

| Typical Screen Analysis - | | |
|---|---|---|
|  | % on | % thru |
| 100 Mesh | 1.0 |  |
| 200 Mesh | 17.5 | 75.5 |

Dough No. 4
 Powdered alpha-cellulose Solkafloc BW-100, The Brown Company/Berlin-Gorham Division, Berlin, N.H., having the following characteristics:
 Grade/Identifier BW-100
 Raw Material Bleached Sulphite Woodpulp (Hardwood)
 Chemical Properties:
  Alpha Content—89.0%
  10% KOH Sol.—17.0
  Ether Extract—0.24%
  G.E. Brightness—94.0%
 Physical Properties:
  Moisture—5-7%
  Bulk Density—135 ML/50 Gram

| Typical Screen Analysis - | | |
|---|---|---|
|  | % on | % thru |
| 100 Mesh | — | 88-98 |
| 200 Mesh | — | 76-88 |

Dough No. 5
 Powdered alpha-cellulose Solkafloc BW-40, The Brown Company/Berlin-Gorham Division, Berlin, N.H., having the following characteristics:
 Grade/Identifier BW-40
 Raw Material Bleached Sulphite Woodpulp (Hardwood)
 Chemical Properties:
  Alpha Content—89.0%
  10% KOH Sol.—17.0
  Ether Extract—0.24%
  G.E. Brightness—94.0%
 Physical Properties:
  Moisture—5-7%
  Bulk Density—135 ML/50 Gram

| Typical Screen Analysis - | | |
|---|---|---|
|  | % on | % thru |
| 100 Mesh | — | 80-90 |
| 200 Mesh | — | 50-65 |

The last five doughs (Nos. 6-10) were duplicate doughs (of Nos. 1-5 respectively) except for absorption and mixing time corrections. The breads were baked for 25 minutes at 430° F. All doughs were mixed 15 minutes. The total dough absorptions used were:
 No. 6—86%; No. 7—75%; No. 8—78%; No. 9—75%; No. 10—78%.

The test comments with respect to the dough feel were as follows:
 Dough No. 6 feels better but it still has a wet feeling. No. 7 is slack but a better development and less wet feeling. No. 8 is similar to No. 6 but is tighter and is less wet. The doughs like No. 5 using a powdered alpha-cellulose having a particle size which permitted less than 70% to pass through the 200 mesh screen were unsatisfactory.

A further variation of the diet bread of this example resulted from making eight doughs from the following formula with the variations as indicated below.

|  | % |
|---|---|
| SPONGE | |
| Flour, Patent | 70.00 |
| Yeast | 2.5 |
| Yeast Food | 0.67 |
| Wheat Gluten | 2.00 |
| Water | 41.00 |
| Enrichment | (0.43 grams) |
| DOUGH | |
| Flour, Patent | 30.00 |
| Brown Sugar | 6.00 |
| Salt | 2.75 |
| 80% Soy Flour and 20% Whey | 3.00 |
| Wheat Gluten | 8.00 |
| Calcium Propionate | 0.50 |
| Calcium Sulfate | 1.25 |
| Sodium Stearyol Lactylate | 0.50 |
| Yeast | 1.50 |
| Potassium Bromate | (20 ppm) |
| Water | 74.5 |
| Alpha-cellulose | (See variables below) |

The sponges were mixed for four minutes at speed No. 2 and set at 78° F. for 3½ hours. The doughs were mixed for 16 minutes at speed No. 2 at 81° F. and allowed to set for a dough time of 20 minutes. The doughs were scaled 18¾ ounces in an 8½″×4½″ pan, proofed ¾″ above the pan. The doughs were all baked for 25 minutes at 440° F.

The variations used were:
Doughs Nos. 1 and 2—15% powdered alpha-cellulose (BH-200 see page 11)
Doughs Nos. 3 and 4—15% powdered alpha-cellulose (BW-100 see page 12)
Doughs Nos. 5 and 6—20% powdered alpha-cellulose (BH-200 see page 11)
Doughs Nos. 7 and 8—20% powdered alpha-cellulose (BW-100 see page 12)

Sesame seeds were sprinkled on top of some of the loaves before baking.

Results

Comments based on the examination of the diet breads made in accordance with the above examples, are as follows:

Doughs Nos. 1 and 2—excellent loaf volume and height, slightly open grain and slightly wet crumb.

Doughs Nos. 3 and 4—slightly less volume but acceptable and a slightly wetter crumb than Doughs 1 and 2 and a silkier texture.

Doughs Nos. 5 and 6—more open grain and a wetter crumb.

Doughs Nos. 7 and 8—slightly drier crumb than Doughs 1 and 2, equal volume, silkier and smoother texture.

| | DIET BREAD DATA | | | | | | | |
|---|---|---|---|---|---|---|---|---|
| VARIABLE | BH-200 15% | BH-200 15% w/ss | BH-200 20% | BH-200 20% w/ss | BW-100 15% | BW-100 15% w/ss | BW-100 20% | BW-100 20% w/ss |
| Loaf Wght. (Grams) | 462.5 | 467 | 456.5 | 466 | 454 | 465.5 | 457 | 467.5 |
| Loaf Wght. (Ozs) | 16.3 | 16.5 | 16.1 | 16.4 | 16.0 | 16.4 | 16.1 | 16.5 |
| No. Slices + Ends | 23 | 23 | 23 | 22 | 23 | 22 | 23 | 23 |
| Slice Thickness (In.) | ⅜ | ⅜ | ⅜ | ⅜ | ⅜ | ⅜ | ⅜ | ⅜ |
| Average Slice Wght. Whole Loaf (g) | 20.1 | 20.3 | 19.9 | 21.2 | 19.7 | 20.2 | 19.9 | 20.3 |
| Average Slice Wght. (10 Slices, No Ends) (g) | 21.9 | 21.6 | 21.4 | 21.8 | 20.7 | 21.7 | 21.4 | 22.1 |

18¾ ounce scaling=85.3–88% yield.
92 grams sesame seeds used per 8 loaves or 11.5 grams or 0.41 ounces per loaf.
Doughs 5 and 6=9.5 grams sesame seeds per loaf.
Doughs 3 and 4=11.5 grams sesame seeds per loaf.
Doughs 7 and 8=10.5 grams sesame seeds per loaf.
An average of 10.5 grams or 0.37 ounces sesame seeds per loaf.
The weight per slice increases with the seeds approximately 0.5 to 1.3 or an average of 0.9 grams slice.

Slicing

Doughs 1 and 2—slice fairly smooth.
Doughs 3 and 4—slice sightly rough.
Doughs 5 and 6—slice slightly rough-wet.
Doughs 7 and 8—slice rough-wet.

EXAMPLE III

Diet Wheat Bread

Eleven different doughs were made using substantially the following formulation with the variations indicated below:

|  | % |
|---|---|
| SPONGE | |
| Flour, Patent | 70.00 |
| Wheat Gluten | 2.00 |
| Yeast | 2.50 |
| Yeast Food | 0.67 |
| Water (on total flour) | 41.00 |
| DOUGH | |
| Flour, Patent | 10.00 |
| Flour, Whole Wheat, Fine | 20.00 |
| Salt | 3.00 |
| Wheat Gluten | 8.00 |
| 80% Soy Flour and 20% Whey | 3.00 |
| Calcium Sulfate | 1.25 |
| Sodium Stearyol Lactylate | 0.50 |
| Calcium Propionate | 0.50 |
| Brown Sugar | 6.00 |
| Yeast | 1.50 |
| Powdered Alpha-cellulose (BH-200 | (variables |

| | % |
|---|---|
| see page 11) and flavorings | below) |
| Water (on total flour) | 69.00 |
| Potassium Bromate | (30 ppm) |

Variable Number 1. 20% powdered alpha-cellulose formula-control.
2. Control formula plus 0.25% Cardamom.
3. Control formula plus 0.25% Cardamom and 0.0625% orange flavor.
4. Control formula plus 0.015% Lime flavor 30-S.
5. Control formula plus 0.015% Lime flavor 301-S.
6. 22% powdered alpha-cellulose—0.25% cardamom plus 60 ppm bromate plus 1% absorption.
7. 25% powdered alpha-cellulose—0.25% cardamom plus 2.5% absorption, 60 ppm of bromate.
8. 25% powdered alpha-cellulose—1% gluten increase in dough, 0.25% cardamom absorption increased 3.5%, bromate 60 ppm.
9. 5% gluten in the sponge and 3% increase in sponge absorption, 3% gluten and 3% absorption from dough, 20% powdered cellulose plus 0.50% Brown Sugar Flavor.
10. Same as No. 9 but with 10% powdered cellulose added to sponge, sponge absorption increased 11%-3% gluten, 11% water and 10% powdered cellulose subtracted from the dough plus 3 grams of brown sugar flavor added to dough.
11. Same as No. 10 but with 10% powdered cellulose in the sponge, 12% powdered cellulose in the dough, 0.75 grams butternut maple flavor added to the dough.

Results

Comments on examination of these breads resulted in the following tabulations:

No. 1, chewy—bland.
No. 2, slight spice aftertaste, more flavor than No. 1.
No. 3, too strong, unpleasant, slightly bitter—2 and 3 lower volume than 1, 4 or 5.
No. 4, slightly more flavor than No. 1.
No. 5, better flavor than No. 4.
No. 6, slight spice—low level flavor.
No. 7, same as No. 6.
No. 8, more tender eating quality, slightly more bitter.
No. 9, brown sugar aroma, very strong brown sugar flavor—too strong.
No. 10, milder brown sugar flavor.
No. 11, sweet aroma, pleasant.

EXAMPLE IV

Diet Wheat Bread

Three additional diet wheat bread doughs were made from a formula illustrated in the previous example for the control, with the following modifications:

| | % |
|---|---|
| SPONGE | |
| Flour, Patent | 70.00 |
| Wheat Gluten | 2.00 |
| Yeast | 2.50 |
| Yeast Food | 0.67 |
| Water (on total flour) | 41.00 |
| Enrichment | (0.43 grams) |
| DOUGH | |
| Flour, Patent | 10.00 |
| Whole Wheat Flour (fine) | 20.00 |
| Salt | 3.25 |
| Wheat Gluten | 9.00 |
| 80% Soy Flour and 20% Whey | 3.00 |
| Sodium Stearyol Lactylate | 0.50 |
| Brown Sugar | 6.00 |
| Yeast | 1.50 |
| Calcium Propionate | 0.50 |
| Calcium Sulfate (anhydrous) | 2.50 |
| Powdered Alpha-cellulose (BH-200 see page 11) | (see variables below |
| Water (on total flour) | 73.50 |
| Bromate | (60 ppm) |
| Cardamom (ground) | 0.33 |

Variables

Three doughs were made in accordance with the control formula involving 20% powdered alpha-cellulose with 0.33% (2 grams) cardamom. In a mixing time series, dough No. 1 had a 12 minute mix, dough No. 2 had a 14 minute mix, dough No. 3 had a 16 minute mix. Six doughs were made from the formula set forth above with 25% powdered cellulose and no bromate in the doughs as follows:

The first series was an absorption series. No. 1 dough had a 114.50% absorption. No. 2 had a 116.50% absorption. No. 3 had a 118.50% absorption. In the second series, the 116.50% absorption was used and the mixing time was varied 12, 14 and 16 minutes.

The results of these showed that the 25% powdered alpha-cellulose formulation was better with higher absorption. The best absorption achieved was 116.50%.

EXAMPLE V

Reduced Calorie White Bread

Three doughs were made from the following formula with the variations indicated below:

| | % |
|---|---|
| SPONGE | |
| Flour, patent (14% moisture basis) | 70.00 |
| Wheat Gluten | 2.00 |
| Yeast | 2.50 |
| Yeast Food | 0.67 |
| Sodium Stearoyl Lactylate | 0.5 |
| Water (on total flour) | 41.00 |
| Vitamin and Mineral Enrichment | (3 tablets) |
| DOUGH | |
| Flour | 30.00 |
| Salt | 3.00 |
| Wheat Gluten | 8.70 |
| 80% Soy Flour and 20% Whey | 3.00 |
| Calcium Sulfate (anhydrous) | 1.25 |
| Brown Sugar | 6.00 |
| Calcium Propionate | 0.50 |
| Yeast | 1.50 |
| Powdered Alpha-cellulose (BH-200 see page 11) | 21.00 |
| Water (on total flour) | 69.00 |
| Bromate | (30 ppm) |

Procedure

The sponge is mixed for four minutes and set at 76° F. for 3½ hours. The dough is mixed for 14 minutes with a dough temperature of 80° F. and a dough set time of 20 minutes. The dough is scaled 18¾ ounces into 8½"×4½" pans. Intermediate proof at 10 minutes. Proofed to ¾" above the pan. The proof box temperature was 110° F. dry; 106° F. wet. Bake for 20 minutes at 450° F., slice ⅜" thick, 22 slices.

The three variations to this formula were:

Dough No. 1—0.3 grams of one brown sugar flavor added.

Dough No. 2—0.3 grams of a different brown sugar flavor added.

Dough No. 3—0.1 gram orange flavor added.

Results

All three variations made satisfactory bread.
No. 1 had a pleasant flavor.
No. 2 had a slight aftertaste.
No. 3 had a slight citrus flavor not as acceptable as No. 1.

EXAMPLE VI

Reduced Calorie Bread

For a series of feeding studies (see below) to be made comparing reduced calorie bread with enriched standard formula bread, a large number of loaves of bread were baked under substantially the same conditions in our laboratory.

The formulation utilized for the reduced calorie bread was that described in the previous example (Example V) the first variation, with the following changes: The powdered alpha-cellulose was increased to 22% instead of the 21% given in the previous example. The gluten was reduced to 10% instead of 10.7%. No bromate was used and the absorption was 112.7% instead of 110%. Both the control standard enriched bread and the reduced calorie bread utilized the same vitamin and mineral enrichment tablets.

Results

Good commercial quality bread was produced by the foregoing and the results of the feeding studies are described hereinafter.

EXAMPLE VII

Reduced Calorie White Enriched Bread

| INGREDIENTS | Parts By Weight Based On 100 Lbs. Total Flour |
|---|---|
| SPONGE | |
| Wheat Flour, Patent | 70.00 |
| Wheat Gluten | 2.00 |
| Yeast | 2.00 |
| Yeast Food | 0.50 |
| Sodium Stearoyl Lactylate | 0.50 |
| Water | 41.00 |
| Vitamin and Mineral Enrichment | (three tablets) |
| DOUGH | |
| Wheat Flour, Patent | 30.00 |
| Salt | 3.00 |
| Brown Sugar | 6.00 |
| 80% Soy Flour and 20% Whey | 3.00 |
| Wheat Gluten | 8.00 |
| Calcium Sulfate | 1.25 |
| Calcium Propionate | 0.50 |
| Powdered Alpha-cellulose (see below) | 22.00 |
| Yeast | 1.50 |
| Water | 74.22 |
| Flavoring | .09 |

The variations used were:

(1) Cellulose BH-200, produced by the International Filler Corporation, No. Tonawanda, N.Y. having the following characteristics:
Grade/Identifier BH-200
Raw Material Bleached Sulphite Woodpulp (Hardwood)
Chemical Properties:
  Alpha Content—89.0%
  10% KOH Sol.—17.0
  Ether Extract—0.24%
  G.E. Brightness —94.0%
Physical Properties:
  Moisture—5-7%
  Bulk Density—135 ML/50 Gram

| Typical Screen Analysis - | | |
|---|---|---|
| | % on | % thru |
| 100 Mesh | 2.5 | |
| 200 Mesh | 10.0 | 86.0 |

(2) Also found acceptable in the Example and with similar characteristics was Cellulose BW-200 produced by Brown Company/Berlin-Gorham Division, Berlin, N.H., having the following characteristics:
Grade/Identifier BW-200
Raw Material Bleached Sulphite Woodpulp (Hardwood)
Chemical Properties:
  Alpha Content—89.0%
  10% KOH Sol.—17.0
  Ether Extract—0.24%
  G.E. Brightness—94.0%
Physical Properties:
  Moisture—5-7%
  Bulk Density—135 ML/50 Gram

| Typical Screen Analysis - | | |
|---|---|---|
| | % on | % thru |
| 100 Mesh | — | 95-99 |
| 200 Mesh | — | 80-90 |

Procedure

The reduced calorie white enriched bread was prepared according to the following procedure:
Mix sponge four (4) minutes (high speed) in Day Horizontal mixer.
Set sponge at 76° F.
Ferment for 3½ hours.
Mix dough 12 minutes (high speed) in Day Horizontal mixer.
(To full development, dry and extensible dough.)
Hold out the salt until pick-up (5 minutes).
Dough temp. 80° F. after mixing.
Dough fermentation time 20 minutes.
Scaling weight 18¾ ounces.
Intermediate Proof 10 minutes.
Shape and place in pan 8½×4½×3¼ inches.
Proof to ¾" above pan.
Bake 18 minutes at 450° F.
Cool and slice.

Results

The approximate 220 loaves which were produced from the example were analyzed and evaluated to confirm that the low calorie bread was similar in all respects to the standard white enriched bread including quality, specific volume, color, grain and texture, crumb and taste. The differences, if any, from the standard white enriched bread were for all intent and purposes undetectable by the evaluators.

EXAMPLE VIII

The procedure for Example VII was repeated with the powdered alpha-cellulose content varying from 15 to 21 parts by weight of total flour. Adjustments were made in the water content to obtain the normal dough by procedures familiar to those skilled in the art.

The resultant loaves were evaluated and, while it was determined that they did not meet the requirements of at least 25% reduction in caloric content, they had substantial reduction in caloric content and were higher fiber content than standard bread.

EXAMPLE IX

The procedure for Example VII was repeated with the powdered alpha-cellulose content increasing from 22 up to 25 parts by weight of total flour with appropriate adjustments in the water content. The water content adjustments were made by procedures familiar to those skilled in the art to obtain the normal dough. The results obtained with the increased amount up to 25% were also acceptable and met the minimum requirements of 25% reduction of calories from the standard formula, and the bread had a satisfactory color, grain, texture and eating quality.

EXAMPLE X

The procedure for Example VII was varied with the powdered alpha-cellulose content increasing from 26 to 30 parts by weight of total flour with appropriate adjustments in water content to compensate for the increase in cellulose and to obtain the normal dough. The results were unsatisfactory and there was an adverse effect on the grain and texture of the bread and it did not produce a loaf satisfactory in eating quality. With an increasing content of cellulose, the resultant product had less appeal than the standard white enriched bread due to many factors including poor slicing ability, a gummy texture and poor grain.

EXAMPLE XI

The procedure for Example VII was repeated with the brown sugar reduced 20% and the flavoring was varied 20%. The results were also found to be acceptable and met the minimum requirements.

EXAMPLE XII

Reduced Calorie Wheat Bread—Sponge Method

A reduced calorie wheat bread was made from the following formula:

| INGREDIENTS | Parts by Weight |
| --- | --- |
| SPONGE | |
| Wheat Flour, Patent, Enriched | 55.0 |
| Whole Wheat Flour, fine | 5.0 |
| Wheat Bran | 10.0 |
| Wheat Gluten | 3.0 |
| Yeast | 2.5 |
| Yeast Food | 0.5 |
| Sodium Stearoyl Lactylate | 0.5 |
| Ethoxylated Monoglycerides | 0.12 |
| Mono- and Diglycerides | 0.18 |
| Water | 46.0 |
| DOUGH | |
| Wheat Flour, Patent, Enriched | 30.0 |
| Salt | 3.0 |
| Brown Sugar | 6.0 |
| Sucrose | 3.0 |
| Soy Flour and Whey | 3.0 |
| Wheat Gluten | 7.0 |
| Calcium Sulfate | 1.25 |
| Calcium Propionate | 0.5 |
| Powdered Alpha-cellulose (see page 35) | 22.0 |
| Yeast | 1.0 |
| Flavor | .09 |
| Water | 79.0 |

The ethoxylated monoglycerides, sodium stearoyl lactylate and the mono- and diglycerides set forth in the above formula are optional dough conditioners. Those skilled in the art will appreciate that succinylated monoglycerides may also be considered as alternate dough strengtheners that can be used in place of or in conjunction with sodium stearoyl lactylate and ethoxylated monoglycerides.

Procedure

The sponge was mixed for 3 minutes and set at 76° F. for 4 hours. The dough was mixed 10 minutes and salt was added after 5 minutes. The dough was fermented at 80° F. for 20 minutes dough time. The dough was scaled 18¾ ounces in 8½"×4½" pans, proofed and baked for 23 minutes at 430° F. The results of this process yielded good commercial bread product.

EXAMPLE XIII

Reduced Calorie Wheat Bread—Brew Method

A reduced calorie wheat bread using the brew and dough procedure was made in accordance with the following:

| BREW AND DOUGH PROCEDURE | |
| --- | --- |
| INGREDIENTS | Parts by Weight |
| BREW | |
| Water | 47.00 |
| Sugar | 4.7 |
| Salt | 1.1 |
| Calcium Carbonate | .3 |
| Yeast | 3.9 |
| DOUGH | |
| Wheat Flour, Patent, Enriched | 85.0 |
| Whole Wheat Flour | 5.0 |
| Wheat Bran | 10.0 |
| Wheat Gluten | 10.0 |
| Selected Powdered Alpha-cellulose (see page 35) | 22.0 |
| Brown Sugar | 5.0 |
| Sucrose | 3.0 |
| Soy Flour and Whey | 3.0 |
| Salt | 1.9 |
| Calcium Sulfate | 1.25 |
| Calcium Propionate | 0.50 |
| Potassium Bromate, Calcium Sulfate, Monocalcium Phosphate | 0.75 |
| Flavor | .09 |
| Sodium Stearoyl Lactylate | 0.5 |
| Ethoxylated Monoglycerides | 0.12 |
| Mono- and Diglycerides | 0.18 |
| Water | 78.0 |

Procedure

The brew is set at a temperature of 80° F. and allowed to rise to a temperature of 88° F. during a fermentation time of about 2 hours. It is then cooled to 45° F.

The cooled brew and all dough ingredients are added to the mixer and mixed in low speed for 5 minutes. The mixer is shifted into high speed and the dough is mixed for about 12 minutes more. Dough temperature should be 78° F. to 82° F.

The dough is allowed to rest for 20 to 40 minutes before dividing and molding.

Results

Satisfactory bread was made in a commercial bakery.

EXAMPLE XIV

White Reduced Calorie Bread by the Brew Method

A reduced calorie enriched white bread using the brew-dough method was made as follows:

|  | % |
|---|---|
| BREW |  |
| Water | 82.42 |
| Corn Sugar | 8.25 |
| Salt | 1.92 |
| Calcium Carbonate | 0.54 |
| Yeast | 6.875 |
| DOUGH |  |
| Brew | 30.7 |
| Water | 97.0 |
| Flour, Patent | 100.0 |
| Selected Powdered Alpha-cellulose (see page 35) | 22.0 |
| Wheat Gluten | 10.0 |
| Sodium Stearoyl Lactylate | 0.50 |
| Brown Sugar | 5.0 |
| 80% Soy Flour and 20% Whey | 3.0 |
| Salt | 2.40 |
| Calcium Sulfate | 1.25 |
| Calcium Propionate | 0.50 |
| Potassium Bromate, Calcium Sulfate, Monocalcium Phosphate | 0.60 |
| Proteolytic Enzyme and Sorbic Acid | 0.25 |
| Flavor | 0.09 |
| Vitamin and Mineral Enrichment | (one tablet) |

Results

Satisfactory bread was made in a commercial bakery.

EXAMPLE XV

High Fiber Bread

The following example of a high fiber bread having considerably less reduction in total caloric content was made:

|  | % |
|---|---|
| SPONGE |  |
| Flour, Patent, Enriched | 50.00 |
| Whole Wheat Flour (fine) | 15.00 |
| Wheat Bran | 5.00 |
| Wheat Gluten | 3.00 |
| Yeast | 2.50 |
| Yeast Food | 0.50 |
| Sodium Stearoyl Lactylate | 0.50 |
| Water (on total flour) | 46.00 |
| Vitamin and Mineral Enrichment | (one tablet) |
| DOUGH |  |
| Flour, Patent, Enriched | 30.00 |
| Salt | 3.00 |
| Soybean Oil | 2.00 |
| Brown Sugar | 6.00 |
| Raisin Juice Concentrate | 6.00 |
| Soy Flour | 2.50 |
| Wheat Gluten | 2.00 |
| Selected Powdered Alpha-cellulose (see page 35) | 12.00 |
| Sesame Seeds | 3.00 |
| Yeast | 1.50 |
| Butter Flavor | .025 |
| Water (on total flour) | 50.00 |

Procedure

The sponge was mixed for 3 minutes and set at 76° F. for 4 hours. The dough was mixed 8 minutes, salt was added after 5 minutes. The dough was proofed at 80° F. for 20 minute dough time.

Results

This formula made very good bread in a commercial bakery.

EXAMPLE XVI

Reduced Calorie White Bakery Formula

|  | % |
|---|---|
| SPONGE |  |
| 4 min., 76° F., 4 hours |  |
| Flour, Patent, Enriched | 70.00 |
| Wheat Gluten | 2.00 |
| Yeast | 2.00 |
| Yeast Food | 0.50 |
| Sodium Stearoyl Lactylate | 0.50 |
| Water (on total flour) | 44.00 |
| Vitamin and Mineral Enrichment | (one tablet) |
| DOUGH |  |
| 80° F., salt in 7 min., total 12 min., 15 min., floortime |  |
| Flour, Patent, Enriched | 30.00 |
| Salt | 3.00 |
| Brown Sugar | 6.00 |
| Sucrose | 3.00 |
| Wheat Gluten | 8.00 |
| Calcium Sulphate | 1.25 |
| Calcium Propionate | 0.50 |
| Selected Powdered Alpha-cellulose (see page 35) | 23.00 |
| Water (on total flour) | 80.00 |
| Flavor | 0.091 |
| Ethoxylated Monodiglycerides | 0.3 |
| Lactalbumin | 1.6 |

Results

This formula gave excellent bread.

The foregoing examples and evaluations indicate that reduced calorie, high fiber content bread products can be produced having the equivalent taste, texture and appeal to standard breads if the cellulose is critically controlled in relation to the total flour content and if the other adjustments indicated as effective are made to provide for an equivalent tasting end product.

In order to substantiate our evaluation, and to demonstrate meaningful results and benefits gained by utilizing the low calorie white enriched bread, a clinical test was conducted with 16 college students. The students were divided into two groups, eight individuals in each group, all on a similar diet with the exception that one group ate 12 slices per day of standard white enriched bread, and the other group ate 12 slices per day of reduced calorie white enriched bread. The test was conducted for an eight week period with 13 students completing the test. Seven students completed the test in the standard white enriched bread group, and 6 students completed the test in the reduced calorie white enriched bread group. Each student in each group consumed the 12 slices per day in addition to the other food provided. Documentation was made for the weight reduction while the usual nutritional guidelines were adhered to. The composite person for the group eating the 12 slices per day of the standard formula white enriched bread lost 13.6 pounds or 1.7 pounds per week or approximately 32% of their excess weight. The composite person for the group consuming 12 slices per day of the reduced calorie white enriched bread lost 19.3 pounds or 2.4 pounds per week or a loss of 41% of the excess weight, this additional loss of weight being solely attributed to the difference in consumption of the reduced calorie bread in place of the white bread. In addition, it was indicated by those consuming the reduced calorie bread that it was in most, if not substantially all, factors the same and as acceptable to them as consuming the standard white enriched bread of which they were generally accustomed.

It is anticipated for the future, in evaluating the reduced calorie formula bread, that substantial benefits may be obtainable by elderly persons who consume the reduced calorie bread, the benefits deriving mainly from the increased consumption of a cellulose which will provide the necessary roughage to contribute to the proper functioning of their digestive and elimination systems. This contribution will not be at the expense of reducing the nutritional value obtainable from the reduced calorie bread, nor will it sacrifice the taste, texture and eating quality which most elderly people have long been accustomed in consuming the standard white enriched bread formulation. These evaluations in connection with this new reduced calorie formulated white enriched bread indicate that a significantly improved formulation has been achieved which substantially advances the value to the consumer without reducing the standard white enriched bread nutrition, appeal and edibility.

It should also be understood by those skilled in the art that while the specific baking examples referred to above are given according to the standard sponge and brew dough procedure utilized in the baking industry, with only slight modifications therefrom, the baking results obtained are valid not only for this sponge dough method but also for the continuous mix, short time, no time and straight dough methods.

Throughout the above, it will be noted that the selected powdered alpha-cellulose utilized in the examples is a food grade alpha-cellulose meeting U.S. Government specifications as first described in the National Formulary, XIV Edition (July 1, 1975) at page 786 and later as set forth in the "Second Supplement to the Food Chemicals Codex, 2nd Edition (1975)" at pages 21 and 22. The selected powdered alpha-cellulose as taught by this application may be described as a purified powdered cellulose, mechanically disintegrated cellulose prepared by processing alpha-cellulose obtained as pulp from fibrous plant materials. It exists in several grades of fineness and the selected alpha-cellulose materials preferred are such that at least 70% of the particles pass through a 200 mesh screen. When 30 grams of the selected alpha-cellulose is mixed with 270 ml of water in a high speed powered blender for 5 minutes, it has a water absorptivity such that a free flowing suspension is obtained in which, after 1 hour of settling, the solids will settle and a supernatant liquid will appear above the layer of cellulose.

The selected powdered alpha-cellulose materials are preferably those which have a particle size such that all or substantially all of the particles pass through the 200 mesh screen and only minor portions remain on the 100 and 200 mesh screens. This is to be contrasted both with those alpha-cellulose grades in which less than 70% pass through a 200 mesh screen and substantial portions remain on the 100 and 200 mesh screens and microcrystalline cellulose products. Microcrystalline cellulose material is described in "Food Chemicals Codex, 2nd Edition (1972)" at pages 185–186 and is a purified, partially depolymerized cellulose prepared by treating alpha-cellulose with mineral acids. Microcrystalline cellulose is identified by mixing 30 grams with 270 ml of water in a high speed power blender for 5 minutes. The resultant mixture, when allowed to stand for 3 hours, is a white, opaque, bubble-free dispersion which does not form a supernatant liquid in the surface.

While we have described above the principles of our invention in connection with specific examples and method steps, it is to be clearly understood that the description and examples are made only to enable practicing of the invention and not as a limitation to the scope of the invention as set forth in the objects thereof and in the accompanying claims.

We claim:

1. A dough for making a bread product having substantially more fiber and fewer calories than conventional bread of the same type and of equal weight and volume made from conventional dough comprising conventional flour and water and a texture and eating quality substantially identical to said conventional bread, said high fiber, low calorie dough comprising:
    an amount of conventional flour less than that in said conventional dough;
    an amount of powdered alpha-cellulose sufficient to provide said bread product with at least 25% fewer calories than said conventional bread, wherein said powdered alpha-cellulose has a particle size such that at least 70% of the alpha-cellulose particles pass through a 200 mesh screen and said amount of said alpha-cellulose weighs about 22–25% of the weight of said amount of flour and comprises a substitute for a significant portion of the flour in said conventional dough;
    an amount of gluten weighing at least 5% of the weight of said amount of flour and sufficient to substantially replace protein lost in the product by substituting said powdered alpha-cellulose for a portion of the flour in said conventional dough; and
    an amount of water greater than that in said conventional dough, wherein said amount of water weighs between 110% and 125% of the weight of said amount of flour and provides said high fiber, low calorie dough with handling characteristics similar to those of said conventional dough.

2. A bread product having substantially more fiber and at least 25% fewer calories than conventional bread of the same type and of equal weight and volume and a texture and eating quality substantially identical to said conventional bread, wherein said bread product is made from the dough recited in claim 1.

* * * * *